United States Patent

Benda et al.

[11] Patent Number: 5,179,564
[45] Date of Patent: Jan. 12, 1993

[54] LINEAR POLARIZATION CONTROL OF HIGH POWER LASERS

[75] Inventors: John A. Benda, Amston; Paul R. Blaszuk, Lebanon, both of Conn.; James L. Forgham, Albuquerque, N. Mex.; Harold L. Cohen, Indialantic, Fla.

[73] Assignee: United Technologies Corporation, Hartford, Conn.

[21] Appl. No.: 781,426

[22] Filed: Oct. 23, 1991

[51] Int. Cl.⁵ .............................................. H01S 3/10
[52] U.S. Cl. ..................................... 372/27; 372/95; 372/94
[58] Field of Search .............................. 372/95, 94, 27

[56] References Cited

U.S. PATENT DOCUMENTS

| | | | |
|---|---|---|---|
| 4,669,088 | 5/1987 | Waite | 372/95 |
| 4,682,339 | 7/1987 | Sziklas et al. | 372/94 |
| 4,792,765 | 12/1988 | Smith et al. | 372/95 |
| 4,841,541 | 6/1989 | Sziklas et al. | 372/94 |

Primary Examiner—Georgia Y. Epps

[57] ABSTRACT

An unstable laser resonator is controlled in polarization by the use of a control leg coupled to the parent resonator and having a linear polarization control element therein, so that control of a low power beam in said control leg serves to control the polarization of the parent resonator.

14 Claims, 3 Drawing Sheets

LINEAR POLARIZATION CONTROL OF HIGH POWER LASERS

DESCRIPTION

1. Cross Reference to Related Applications

This application is related to the subject matter disclosed and claimed in copending U.S. Ser. No. 07/781,771 entitled A HIGH POWERED LASER WITH REDUCED OPTICAL ABERRATION by P. R. Blaszuk;

U.S. Ser. No. 07/780,877 entitled A HIGH POWER LASER HAVING STAGED LASER ADJOINT PULSED FEEDBACK by S. S. Townsend, P. R. Cunningham and J. S. Foley;

U.S. Ser. No. 07/780,637 entitled OPTICALLY PULSED LASER HAVING COUPLED ADJOINT BEAMS by J. A. Benda;

U.S. Ser. No. 07/780,898 entitled A MODE-LOCKED HIGH POWER LASER HAVING AN ADJOINT FEEDBACK BEAM by J. A. Benda, P. R. Blaszuk and G. E. Palma;

U.S. Ser. No. 07/781,431 entitled PULSED RING LASERS USING ADJOINT COUPLING CONTROL by G. E. Palma and J. A. Benda;

U.S. Ser. No. 07/781,430 entitled OPTICALLY PULSED LASER by J. A. Benda, P. R. Blaszuk, G. E. Palma and D. C. Smith;

U.S. Ser. No. 07/781,427 entitled IMPROVED LINEAR POLARIZATION CONTROL OF HIGH POWER LASERS by G. E. Palma, S. S. Townsend, A. Parasco and J. A. Benda;

U.S. Ser. No. 07/781,428 entitled CIRCULAR AND ELLIPTICAL POLARIZATION OF A HIGH POWER LASER BY ADJOINT FEEDBACK by J. A. Benda and P. R. Blaszuk filed on even date herewith and assigned to the same assignee herein incorporated by reference.

2. Technical Field

The field of the invention is that of high power lasers having an output mode that is magnifying with each round trip in the resonator and an adjoint mode that is demagnifying.

3. Background Art

U.S. Pat. No. 4,682,339, assigned to the assignee hereof, illustrates a method of coupling standing wave lasers in which two modes exist in the resonator, one magnifying as it circulates in the resonator and the other demagnifying. A portion of the output beam is sampled and injected back into the resonator mode-matched to the demagnifying mode. U.S. Pat. No. 4,841,541, illustrates the use of adjoint coupling with unstable ring resonators. These disclosures relate to unpolarized lasers.

It is advantageous to provide high power polarized beams for welding and other application but prior art methods, such as that illustrated in FIG. 1, have drawbacks.

DISCLOSURE OF INVENTION

The invention relates to a method of controlling the polarization of a high power laser resonator in which a polarization discriminating element within a low power beam is used to control polarization rather than control by use of a polarization discriminating element within the parent resonator.

A portion of the laser output beam is passed into a polarizing element that reflects preferentially one polarization state back into the adjoint mode of the resonator such that it is mode-matched to the adjoint mode.

Other features and advantages will be apparent from the specification and claims and from the accompanying drawings which illustrate an embodiment of the invention.

BEST MODE FOR CARRYING OUT THE INVENTION

A difficulty that has interfered with progress in the art is that it has been difficult to achieve satisfactory control of the polarization of high power lasers. The usual methods employed with low power lasers are not feasible with high power and workers in the art have had to make do with unsatisfactory substitutes such as a pair of orthogonal mirrors located in the cavity. Being in the cavity, they are very sensitive to alignment errors and difficult or impossible to adjust without dismantling the laser.

Figure 1:
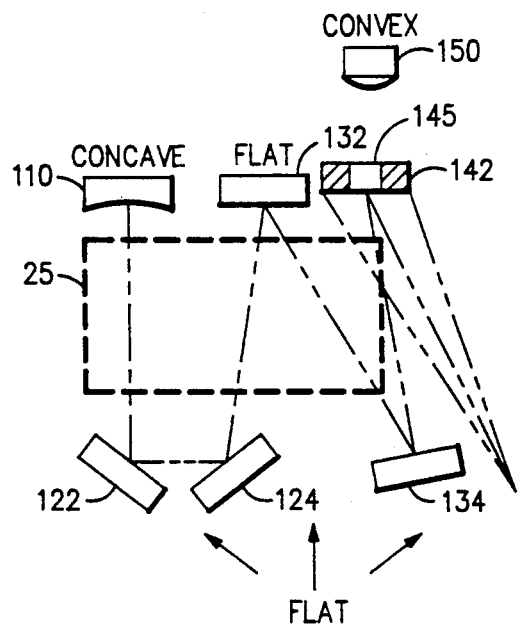
FIG. 1 illustrates a prior art polarized laser system.

Referring now to FIG. 1, there is shown a laser resonator 100 in which a gain medium 25 amplifies laser radiation that is passing between concave mirror 110 and convex mirror 150. Four intermediate mirrors 122, 124 and 132, 134 serve to reflect the beam through gain medium 25 a number of times. The purpose of mirrors 122 and 124 (oriented perpendicular to the plane of the paper) is to control the polarization state of the resonated radiation to suppress polarization having its axis in the plane of the paper. The mechanism is that there is a slight difference in the reflectivity of the mirrors for polarization perpendicular and parallel to the plane of the paper that is sufficient to suppress the undesired mode. A conventional output mirror 142 having aperture 145 is used to deflect output beam 70.

A drawback of this approach is that the two mirrors 122, 124 take up extra space Which is always in short supply. In addition, since the polarization control elements are within the laser resonator, they are sensitive and may not be adjusted easily. It would be difficult to put other types of polarization discriminating elements into main resonator of a high power laser such as thin film polarizers or Brewster angle windows, because of the high flux loading that would result in these elements.

Figure 2:
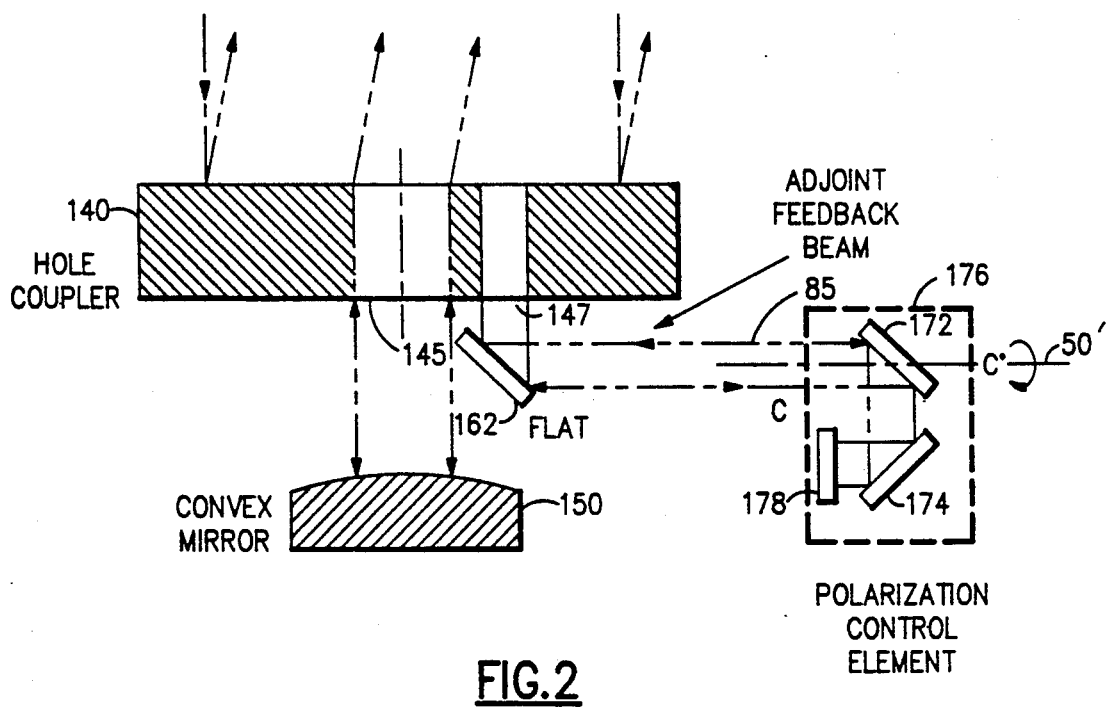
FIG. 2 illustrates a polarization control section of a laser according to the invention.

Referring now to FIG. 2, there is shown an alternative output mirror 140 having the same aperture 145 to pass radiation to mirror 150 as before. An additional feedback aperture 147 is placed at a certain distance from the axis of the radiation to tap off a small portion of the output beam. This sub-beam 85 is deflected by optional mirror 162 to polarization means 170. The polarization control may be effected by a number of things: a thin polarizing film, a stack of Brewster plates, or a pair of mirrors as illustrated in FIG. 2. The whole of unit 170 may be rotated around axis 50' of beam 85 to control the angle of the polarization vector with respect to the plane of the paper. In this case, the mechanism of polarization control is a pair of mirrors 172 and 174 aligned with an axis perpendicular to axis 50' and a third retroreflecting mirror 176. This unit controls the polarization state of the returning beam 85 as is known in the art.

Figure 3:
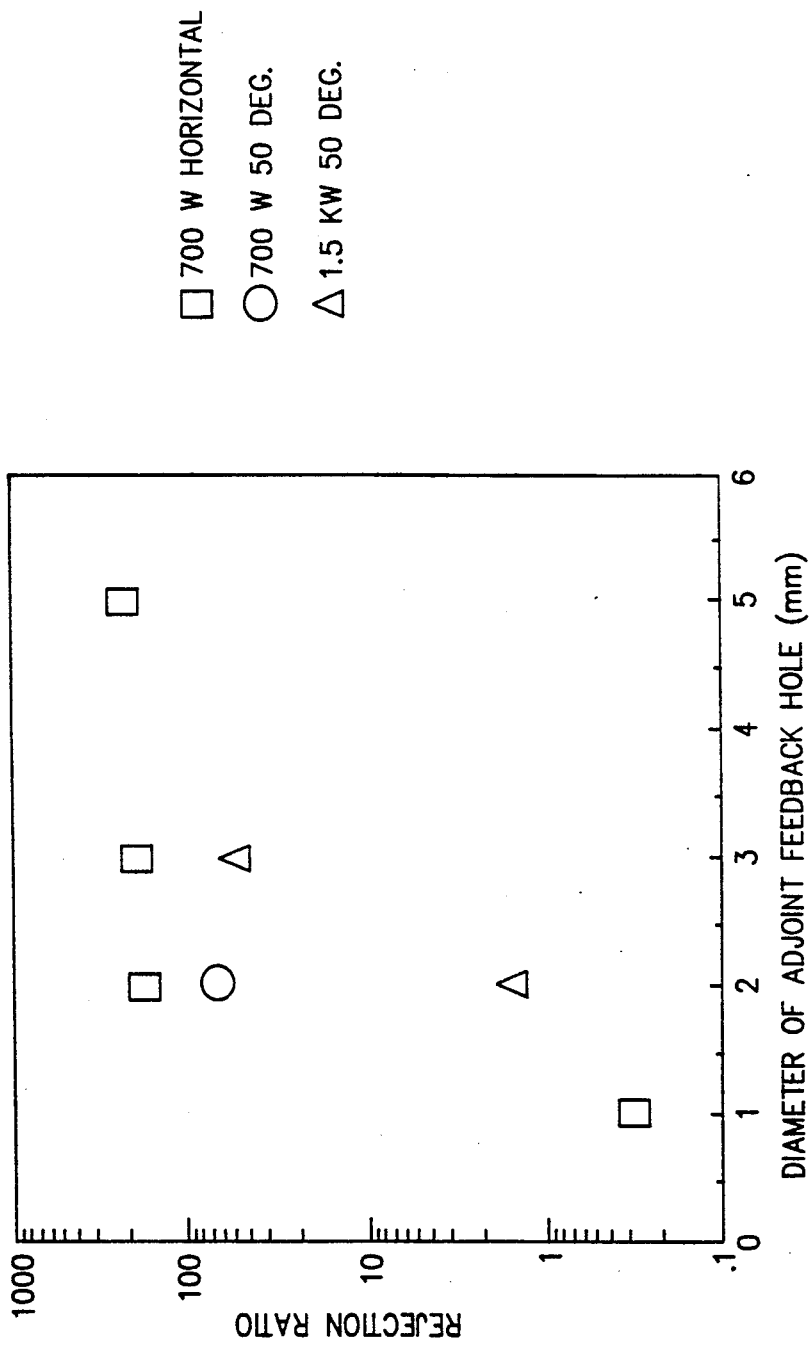
FIG. 3 illustrates experimental results of the embodiment of FIG. 2.

Referring now to FIG. 3, there is shown experimental data plotting the rejection ratio or the ratio of the power of output beam 75 in the desired polarization state divided by the power in the undesired orthogonal polarization state for a high power $CO_2$ laser. In three cases, at powers of 700 watts and 1.5 kilowatts, data was taken for a variety of adjoint feedback apertures with a stack of Brewster plates used as the polarizing element. As can be seen by the data for the 700 watt horizontal polarization case, there is a sharp decrease in the rejection ratio in going from a diameter of 2 mm to 1 mm. In all cases, the nominal diameter of the beam at mirror 140 was 5 cm. Similarly, the data for the 1.5 kilowatt beam at an angle of 50° with respect to the horizontal show a sharp fall off between 3 mm and 2 mm. The low power 50° data is at a high rejection ratio at a diameter of 2 mm, which is consistent with the low power horizontal data.

It is evident that there is a critical connection between the diameter of the feedback beam and the parameters of the laser resonator. It is observed that the diameter of the feedback beam is in the range of about 1/10 to 1/100 of the output beam. The power, for a typical nominally top hat output beam is that the power in beam 85 is about 1/100 to 1/10000 of the power in beam 75. This extremely high ratio of controlled power to controlling power depends on careful design to ensure that the power in the adjoint beam is controlled to within the tolerance of the polarizing element and the polarization in the main resonator is controlled. It should be noted that the laser is still operating at the low feedback apertures where the polarization control fails, so that the parent resonator is well above threshold.

Figure 4:
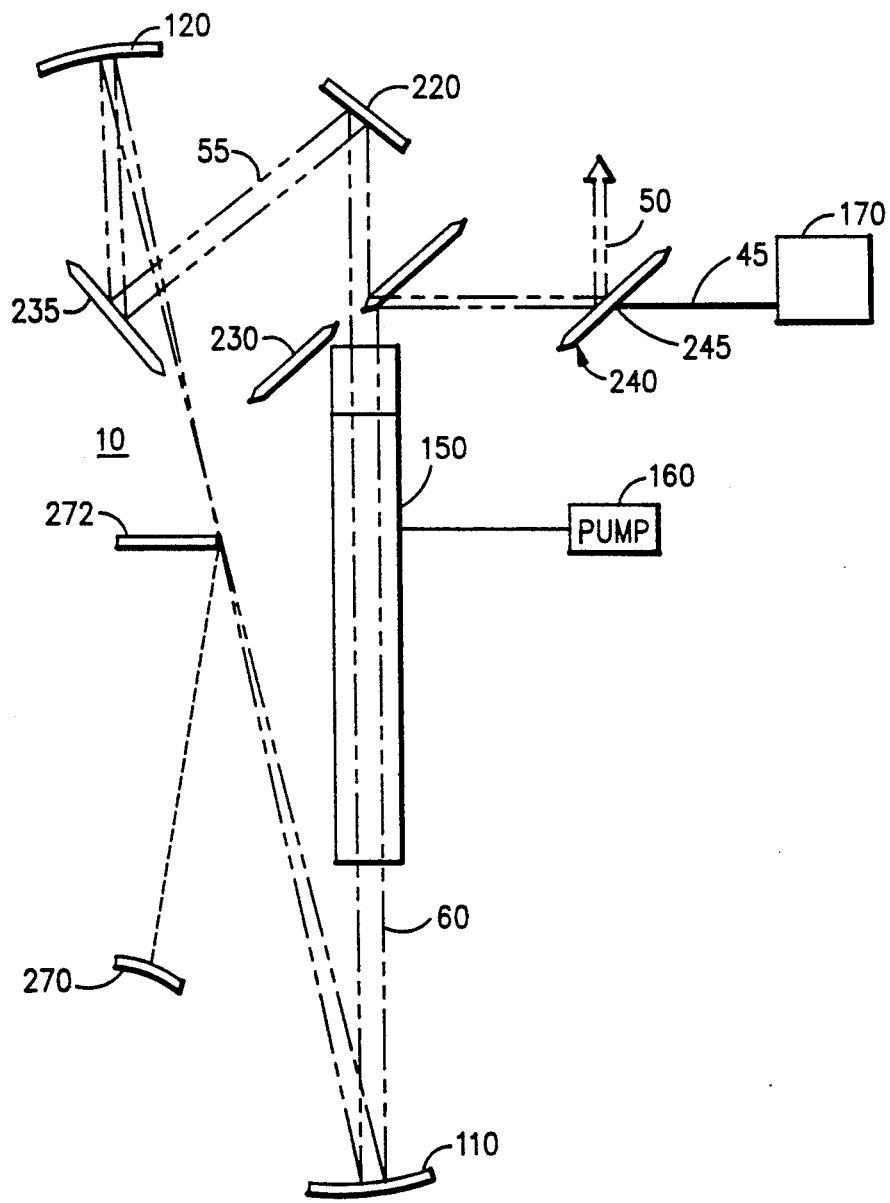
FIG. 4 illustrates a ring laser system employing the invention.

Those skilled in the art may readily devise other embodiments of the invention. In general, the output feedback aperture and the return aperture need not be the same, though the embodiment of FIG. 1 uses a single aperture. The feedback aperture need not be placed on the output mirror. The resonator need not be a confocal standing wave resonator as illustrated in FIG. 1. Ring lasers could also be used, as disclosed in FIG. 4 in which a ring resonator laser, indicated collectively by the numeral 10, has a collimated section having a gain medium 150, pumped by pump means 160, and a confocal magnifying section having two concave mirrors 110 and 120 and a reverse wave suppressor comprising mirrors 270 and 272 that couple the reverse wave to the forward wave as taught in U.S. Pat. No. 4,841,541, incorporated herein by reference. An output mirror 230 deflects output beam 50 from the circulating beam 60 and permits passage of a feedback beam 45 through aperture 245 of turning mirror 240. Turning mirrors 220 and 235 transport beam 55 to an appropriate angle to be fed back into feedback mirror 120. Feedback beam 45 has a polarization discriminating element 170 as in the embodiment of FIG. 2. The invention will work best on parent ring resonators that have no polarization discrimination built into them, such as planar rings with an even number of mirrors.

As will be explained below, feedback beam 45 is reflected back into resonator 100 and all types of unstable resonators in a particular configuration of direction and phase distribution such that it is mode matched to the adjoint mode of the resonator. A definition of adjoint mode is given in "Orthogonality Properties of Optical Resonator Eigenmodes", Optics Comm., Vol. 31, pp. 369-373, Dec. 1979. This causes the reflected radiation to converge down into the optic axis of the resonator, making several passes before diffractively spreading and contributing to the resonator losses or output. The effect of this is to reduce the resonator loss (by increasing the system feedback) more than by other means of injecting the feedback beam, thus allowing a low power beam to have a large effect.

In the example shown, the output radiation is collimated, so the output beam is simply reflected with a flat mirror. In general, for a non-collimated feedback beam, a curved mirror will be necessary to mode match the adjoint mode of the resonator.

The "leverage" effect from the use of adjoint feedback rather than non-adjoint feedback results from the fact that in this type of unstable resonator the adjoint mode is demagnifying down to the resonator axis 101, so that the radiation fed back in from adjoint beam 45 makes several passes as it "walks" or converges down to axis 101 before it diffractively spreads and contributes to the output or losses of the resonator. The adjoint feedback power thus makes many more passes through the gain medium than non-adjoint feedback power would before significant amount of it is lost.

In the embodiment illustrated, the power fed back is in the adjoint mode of the forward wave, which has the same radial structure as the forward wave but travels in the opposite direction. This radiation couples to the reverse wave and is then coupled again to the forward wave. Power could also be fed back mode-matched to the adjoint mode of the reverse wave, with suitable optics.

It has been discovered that a feedback aperture having an area only about 0.1% of the area of (or intercepting about 0.1% of the output power) can have a noticeable effect on the output beam, in particular, on the phase and intensity distribution. This can be viewed as a consequence of the fact that the composite resonator will have different modes than the parent resonator. If the feedback hole is made too large, serious beam quality degradation can occur compared with the beam quality associated with the parent resonator. Beam quality is calculated conventionally as a measure of the deviation of the focal spot size of the actual focused output beam from diffraction-limited. Beam quality, as well as the impact on polarization discrimination, has been calculated to be a function of the radial position of aperture 145, with a position close to the center being slightly preferred.

In addition, there is a range of feedback aperture diameters for preferred operation. If the diameter of the feedback aperture is d, the limiting diameter of the resonator (mirror or gain medium) is D, and the distance between them is L', and the radiation wavelength is $\lambda$, then there will be a significant loss of feedback power when $2\lambda L'/d > D$, i.e. $d > 2\lambda L'/D$ is preferred. The beam quality perturbations discussed above set a limit on the maximum diameter that can be tolerated for aperture 145. Thus, d should be between a lower bound, or threshold diameter, set by the diffraction limit and an upper bound, upper diameter limit, set by the beam quality. The lower bound may be set by the requirement that the feedback power be above a threshold power great enough to increase the gain above threshold or it may be set by the requirement for polarization control illustrated in FIG. 3. Which of the two bounds is the limiting factor will depend on the details of the resonator design. Operation with the parent resonator above threshold is expected to be the most common configuration. Other parameters of the system may be varied, such as placing a smaller aperture in a more intense portion of the output radiation, so that the optimum design trade off will depend on the design of the parent resonator and the required beam quality (2x diffraction limited, 4x-, etc.). Increasing the magnification of parent resonator 100 will enhance the suppression of cw oscillation (and vice versa). Additionally, decreased magnification will produce greater intensity and so permit the use of a smaller feedback aperture. Any type of power supply or pumping means can be used: optical pumping, electrical pumping by means of a DC or pulsed power supply or by an RF power supply can all be used with the invention.

It has been observed that backscatter from the workpiece in welding operations tends to depolarize the laser, so that a greater amount of feedback power may be required in such applications, at the cost, of course, of decreased beam quality resulting from the different mode structure of the compound resonator.

It should be understood that the invention is not limited to the particular embodiments shown and described herein, but that various changes and modifications may be made without departing from the spirit and scope of this novel concept as defined by the following claims.

We claim:

1. A laser system comprising a standing wave unstable parent laser resonator having a gain medium, pump means for producing a population inversion in said gain medium, mirror means disposed along an axis for directing optical radiation through said gain medium in a magnifying output mode and a demagnifying adjoint mode, a parent resonator magnification, a parent resonator feedback value, and output means for directing an output beam out of said unstable resonator, comprising;

adjoint feedback means having at least one feedback aperture disposed to intercept radiation in said magnifying output mode, whereby a portion of said radiation in said magnifying output mode passes through said at least one feedback aperture as an output feedback beam, and for passing through a return feedback aperture of said at least one feedback aperture an adjoint mode feedback beam in said demagnifying adjoint mode;

said adjoint feedback means includes adjoint feedback reflection means for receiving said output feedback beam passed through said feedback aperture and for feeding back through said return feedback aperture said adjoint mode feedback beam having a predetermined amount of feedback power in said demagnifying adjoint mode, whereby radiation in said output mode in said parent resonator is coupled to said adjoint mode in said parent resonator through the passing of said adjoint mode feedback beam through said return feedback aperture, and said laser system comprises a compound resonator including said parent laser resonator and a resonator control leg comprising said adjoint feedback reflection means;

feedback beam polarization means are located intercepting said output feedback beam, for impressing a desired linear polarization state on said adjoint mode feedback beam, so that said resonator control leg comprises said adjoint feedback reflection means and said feedback beam polarization means and feeds radiation in said desired linear polarization state above a predetermined threshold amount of feedback power back into said parent laser resonator in said adjoint mode so that said resonator control leg controls the polarization of said parent laser resonator.

2. A laser system according to claim 1, in which said parent resonator is a standing wave unstable resonator.

3. A laser system according to claim 1, in which said feedback aperture has a diameter greater than a threshold diameter that passes said predetermined feedback threshold amount of feedback power and less than a predetermined upper diameter limit determined by a desired beam quality.

4. A laser system according to claim 1, in which said beam polarization means is rotatably mounted about a feedback beam axis of said adjoint mode feedback beam, so that said linear polarization state has a variable azimuthal angle about said feedback beam axis.

5. A laser system according to claim 2, in which said beam polarization means is rotatably mounted about a feedback beam axis of said adjoint mode feedback beam, so that said linear polarization state has a variable azimuthal angle about said feedback beam axis.

6. A laser system according to claim 3, in which said beam polarization means is rotatably mounted about a feedback beam axis of said adjoint mode feedback beam, so that said linear polarization state has a variable azimuthal angle about said feedback beam axis.

7. A laser system according to claim 4, in which said gain medium is $CO_2$.

8. A laser system according to claim 5, in which said gain medium is $CO_2$.

9. A laser system according to claim 6, in which said gain medium is $CO_2$.

10. A laser system according to claim 1, in which said parent resonator is a ring unstable resonator.

11. A laser system according to claim 10, in which said feedback aperture has a diameter greater than a threshold diameter that passes said predetermined feedback threshold amount of feedback power and less than a predetermined upper diameter limit determined by a desired beam quality.

12. A laser system according to claim 11, in which said beam polarization means is rotatably mounted about a feedback beam axis of said adjoint mode feedback beam, so that said linear polarization state has a variable azimuthal angle about said feedback beam axis.

13. A laser system according to claim 11, in which said gain medium is $CO_2$.

14. A laser system according to claim 12, in which said gain medium is $CO_2$.

* * * * *